Feb. 7, 1950  H. M. GRAY  2,496,713
SPRING SHACKLE OF C TYPE CONSTRUCTION
Filed July 1, 1947
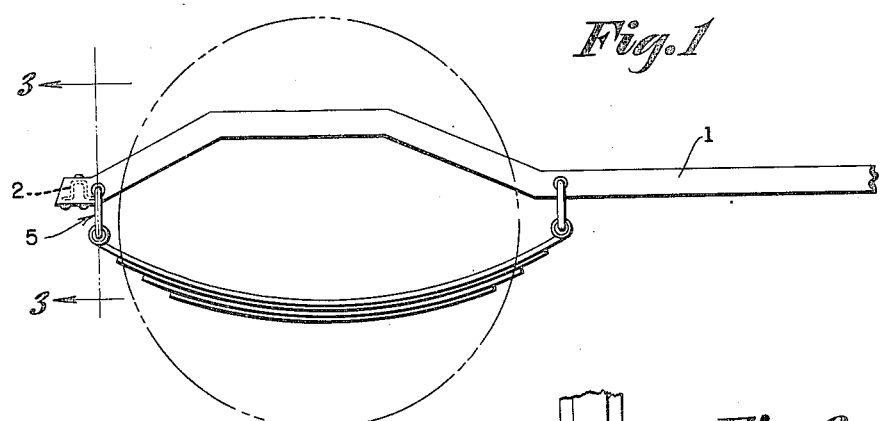
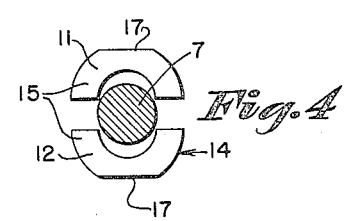
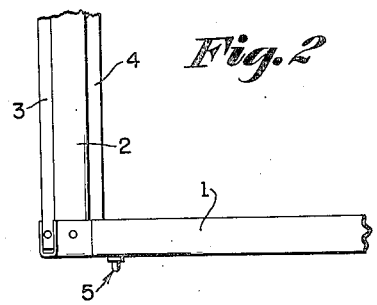
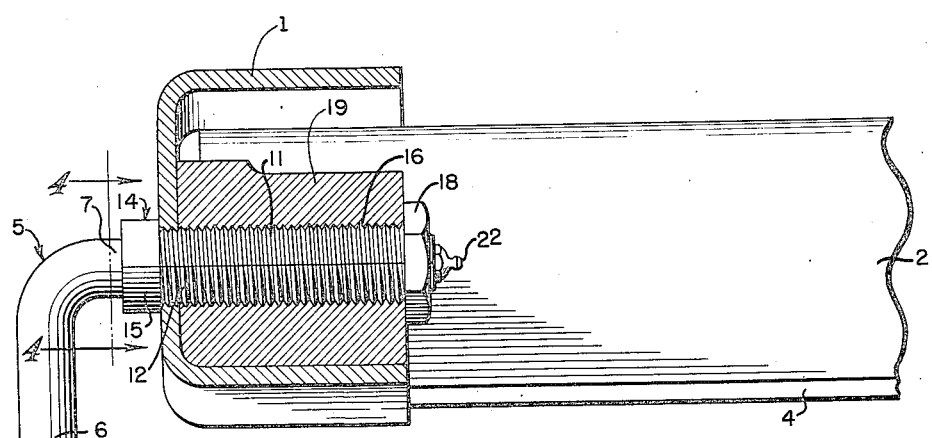
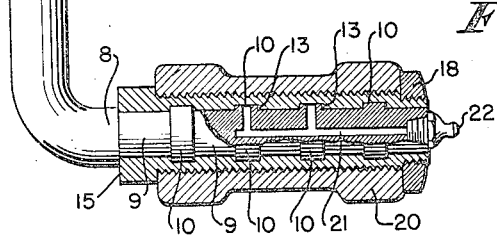
Inventor
HAROLD M. GRAY
By Mason, Fenwick & Lawrence
Attorneys Patented Feb. 7, 1950

2,496,713

UNITED STATES PATENT OFFICE 2,496,713

SPRING SHACKLE OF C TYPE CONSTRUCTION

Harold M. Gray, Masontown, Pa.

Application July 1, 1947, Serial No. 758,363

1 Claim. (Cl. 267—54)

This invention relates to shackles for the spring suspension or support of vehicles. It relates particularly to an open shackle of the C type.

Customarily, shackles form an oscillating connection between the spring and chassis, or between the spring and axle of the vehicle, and whether the shackle is under compression or tension depends upon whether it is between the spring and chassis, in which position it is under compression, or between the spring and axle, in which case it is under tension.

Obviously a closed shackle, that is, a shackle having connecting links at both sides of the shackle bars, is optimum for load bearing efficiency, since the shackle bars are supported at both ends and the shape of the shackle cannot be distorted by excessive load. However, there are chassis constructions in which there is an obstruction in the path of oscillation of one of the links of a closed shackle, so that the obstructed link must be omitted. In such case, resort is had to the C type shackle, the open side of the C facing the obstruction.

In the conventional C shackle, the shackle bars are of plain cylindrical form and pass respectively through a plain cylindrical bearing in the spring eye and a similar bearing in the adjacent supporting or supported structure. Under excessive load the shackle bars, which are normally parallel, are stressed so that they tend either to converge or diverge, according to whether the shackle is under compression or tension, so that the shackle bars tend to cant in their bearings, resulting in the load no longer being uniformly distributed throughout the length of the bearing, but being concentrated at the ends of the bearing, producing undue wear of the bearings and shackle bars, creating excessive play at the ends, so that the bearings do not retain lubricant, starting the vicious circle of conditions that lead to rapid wear and destruction of the shackle.

One of the objects of the present invention is to provide a shackle construction of the C type that will maintain substantially uniform distribution of the load throughout the length of the bearing interface, under conditions of excessive load.

Another object of the invention is to provide a C type shackle construction designed for the retention of lubricant.

A further object of the invention is the provision of a C type shackle which will not work loose with respect to the members to which it is connected.

Other objects of the invention will appear as the following description of a preferred and practical embodiment thereof proceeds.

In the drawing throughout the figures of which the same reference characters have been used to denote identical parts:

Figure 1 is a side elevation of the rear portion of a spring automobile chassis showing the shackle of the present invention interposed between the spring and chassis;

Figure 2 is a fragmentary plan view of a rear corner of the chassis;

Figure 3 is a vertical section taken along the line 3—3 of Figure 1;

Figure 4 is a vertical section taken along the line 4—4 of Figure 3, the bearing inserts being shown slightly separated.

Referring now in detail to the several figures, the numeral 1 represents the side frame member of the chassis, which for example is shown, see Figure 3, as a channel bar with its open side facing inward. A rear cross member 2 has its end extending into the side frame member and riveted thereto. It is shown as a downwardly facing channel having the outwardly turned flanges 3 and 4. The shackle 5 of the present invention is shown connected to the side frame member 1 at a point so close to the cross member 2 that had it been a closed shackle with a side link on the inside, the latter would collide with the flange 4 of the cross member upon excessive rearward oscillation of the shackle. This illustrates a situation in which the preferred use of a C type shackle is indicated, but the C type shackle is of general application and not restricted to uses to which the closed type shackle is inapplicable.

Referring now to Figures 3 and 4, which show the detailed construction of the subject shackle, the latter comprises a cylindrical rod bent into C shape, the intermediate portion forming a side link 6, and the end portions forming identical shackle bars 7 and 8. Said shackle bars are each machined to form reduced cylindrical portions 9 of the same diameter, alternating with cylindrical collars 10 of uniform diameter, preferably being the diameter of the stock. The shackle bars begin and end with reduced portions.

A pair of semi-cylindrical inserts 11 and 12 are provided for each shackle bar, which fit together to form a split bushing 14 about the shackle bar having a bore of shape complementary to that of the shackle bar, including channels 13 which receive the collars 10, the bushing fitting the shackle bar with a free running fit. Externally the bushing has the form and function of a bolt, being provided with a head 15 at one end and having a threaded shank 16. The head has opposite flats 17 for engagement by a wrench. The end of the bushing opposite the head is of reduced diameter and threaded for the reception of a lock nut 18.

In Figure 3 a block 19 is shown welded within the side frame member 1, and having a horizontal threaded bore, the diameter and shape of the thread corresponding to the thread on the shank of the bushing, which bore is extended through the side web of the frame member 1. A leaf spring eye 20 is also shown, having a similar horizontal threaded bore.

In assembling, the inserts are brought together around the shackle bars and the split bushings thus formed are presented to the outer ends of the respective bores through the member 1 and block 19 of the chassis, and the eye 20 of the leaf spring. The bushings are then screwed in by a wrench applied to the heads 15 until the heads are in tight abutment respectively against the side frame member 1 and the spring eye 20. The widths of the spring eye and block are such as to cause the reduced ends of the bushings to project beyond said members when the bushings are fully screwed into place. The lock nuts are then screwed upon said reduced ends until in tight abutment respectively against the block 19 and spring eye. The bushings thus become a unitary and immovable part of the structure into which they are screwed and from which the shackle bars cannot possibly escape, due to the interdigitating relationship of the collars 10 and channels 13.

When the shackle bars are subjected to sufficient load stress to divert them from their normal relation of parallelism, so that they tend to cant in their respective bushings, the sides of the collars 10 thrust against the sides of the channels 13 in which they ride, maintaining the coaxial relation between the shackle bars and bushings, and keeping the load uniformly distributed throughout the length of the shackle bars.

The small clearance space in the channels 13 between the collars and the walls of the channels constitute reservoirs for a limited amount of lubricant which is slowly fed to the entire interfacial surface of the bearings. The shackle bars may each be provided with an axial lubricant bore 21, having radial branches opening in the surfaces of the innermost collars and communicating at its outer end with a grease fitting 22, mounted upon the end of the shackle bar.

While I have in the above description disclosed what I believe to be a preferred and practical embodiment of the invention, it will be understood by those skilled in the art that the details of construction and arrangement of parts is by way of example and not to be construed as restricting the scope of the invention.

What I claim as my invention is:

Spring shackle comprising a substantially C-shaped member having an intermediate side link portion and parallel cylindrical end portions forming shackle bars, said shackle bars at spaced points intermediate their length having integral collars with side faces in radial planes, longitudinally split bushings surrounding said shackle bars with a free running fit, having cylindrical channels complementary to said collars receiving the same, said bushings each having a head at one end with wrench engaging facets, a reduced threaded portion at its opposite end, and being externally threaded between said head and reduced portion, and a lock nut on said reduced portion of larger diameter than said externally threaded portion, said shackle bars being provided with lubricant passages extending from their free ends and opening into the bearing interfaces between said shackle bars and bushings.

HAROLD M. GRAY.

REFERENCES CITED

The following references are of record in the file of this patent:

UNITED STATES PATENTS

| Number | Name | Date |
|---|---|---|
| 885,111 | Vollmer | Apr. 21, 1908 |
| 2,002,284 | Banta | May 21, 1935 |
| 2,069,781 | Skillman et al. | Feb. 9, 1937 |
| 2,170,455 | Leighton | Aug. 22, 1939 |
| 2,191,528 | Hewel | Feb. 27, 1940 |

FOREIGN PATENTS

| Number | Country | Date |
|---|---|---|
| 608,806 | France | Apr. 30, 1926 |